(12) United States Patent
Moncelle et al.

(10) Patent No.: US 7,320,316 B2
(45) Date of Patent: Jan. 22, 2008

(54) CLOSED CRANKCASE VENTILATION SYSTEM

(75) Inventors: Michael E. Moncelle, deceased, late of Bloomington, IL (US); by Patricia Moncelle, legal representative, Bloomington, IL (US); D. Craig Young, Chillicothe, IL (US); Anthony Cazzato, Peoria, IL (US); William P. Fornof, Girard, PA (US); Paul G. Reisinger, Lorain, OH (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/476,731

(22) Filed: Jun. 29, 2006
(Under 37 CFR 1.47)

(65) Prior Publication Data

US 2007/0107709 A1    May 17, 2007

Related U.S. Application Data

(60) Provisional application No. 60/731,484, filed on Oct. 31, 2005.

(51) Int. Cl.
*F02B 25/06* (2006.01)
(52) U.S. Cl. .................... 123/572; 123/41.86
(58) Field of Classification Search ........ 123/572–574, 123/41.86
See application file for complete search history.

(56) References Cited

U.S. PATENT DOCUMENTS

| | | | |
|---|---|---|---|
| 3,213,608 A | 10/1965 | Littell | |
| 3,765,386 A | 10/1973 | Ottofy | |
| 3,769,798 A | 11/1973 | Whittaker | |
| 3,844,260 A | 10/1974 | Scott, Jr. et al. | |
| 3,846,980 A | 11/1974 | DePalma | |
| 3,903,858 A | 9/1975 | Hecht | |
| 4,011,846 A | 3/1977 | Gagliardi | |
| 4,092,962 A | 6/1978 | Beaton et al. | |
| 4,136,650 A | 1/1979 | Manookian, Jr. | |
| 4,270,508 A | 6/1981 | Lindberg | |
| 4,363,310 A | 12/1982 | Thurston | |
| 4,512,325 A | 4/1985 | DePakh | |

(Continued)

OTHER PUBLICATIONS

Moncelle (deceased) et al., U.S. Appl. No. 11/476,730, filed Jun. 29, 2006, entitled "Closed Crankcase Ventilation System,".

*Primary Examiner*—Marguerite McMahon
(74) *Attorney, Agent, or Firm*—Finnegan, Henderson, Farabow, Garrett & Dunner

(57) ABSTRACT

A closed crankcase ventilation system for an internal combustion engine is disclosed. A compressor is configured to compress air and enhance the venting of crankcase emissions from a crankcase of the engine. A flow path is provided between the crankcase and an intake of the compressor. A prioritizing device is situated in the flow path and configured to regulate the flow of crankcase emissions and control pressure within the crankcase. A treatment element is provided downstream of the compressor and configured to treat the compressed air and crankcase emissions to remove entrained oil. A first conduit downstream of the treatment element is configured to introduce a first portion of the compressed air and crankcase emissions into one of an exhaust system for the engine and an air intake system for the engine. A second conduit downstream of the treatment element is configured to introduce a second portion of the air and crankcase emissions into a system having at least one component utilizing compressed air for its operation.

20 Claims, 2 Drawing Sheets

U.S. PATENT DOCUMENTS

| | | | |
|---|---|---|---|
| 4,517,951 A | 5/1985 | Otaka et al. | |
| 4,557,226 A | 12/1985 | Mayer et al. | |
| 4,558,681 A | 12/1985 | Mookerjee | |
| 4,570,603 A | 2/1986 | Piedrafita | |
| 4,616,620 A | 10/1986 | Paoluccio | |
| 4,672,939 A | 6/1987 | Yokoi et al. | |
| 4,811,697 A | 3/1989 | Kurahashi | |
| 5,027,783 A | 7/1991 | von Riesen | |
| 5,205,265 A | 4/1993 | Kashiyama et al. | |
| 5,417,184 A | 5/1995 | McDowell | |
| 5,456,239 A | 10/1995 | Henderson et al. | |
| 5,487,371 A | 1/1996 | Beckman et al. | |
| 5,494,020 A | 2/1996 | Meng | |
| 5,499,616 A | 3/1996 | Enright | |
| 5,582,145 A | 12/1996 | Aizawa et al. | |
| 5,803,025 A | 9/1998 | Feucht | |
| 5,860,396 A | 1/1999 | Muth | |
| 5,941,219 A | 8/1999 | Takebe | |
| 6,112,707 A * | 9/2000 | Kirk | 123/65 BA |
| 6,123,061 A | 9/2000 | Baker et al. | |
| 6,129,058 A | 10/2000 | Muth | |
| 6,155,213 A | 12/2000 | Tanis | |
| 6,196,207 B1 | 3/2001 | Megas | |
| 6,247,463 B1 | 6/2001 | Fedorowicz et al. | |
| 6,345,614 B1 | 2/2002 | Shureb | |
| 6,354,283 B1 | 3/2002 | Hawkins et al. | |
| 6,405,721 B1 * | 6/2002 | Moren | 123/572 |
| 6,439,174 B1 | 8/2002 | Shea et al. | |
| 6,457,462 B2 | 10/2002 | Morén | |
| 6,478,019 B2 | 11/2002 | Fedorowicz et al. | |
| 6,527,821 B2 | 3/2003 | Liu et al. | |
| 6,530,366 B2 | 3/2003 | Geiger et al. | |
| 6,553,978 B2 | 4/2003 | Takashiba | |
| 6,588,201 B2 | 7/2003 | Gillespie | |
| 6,647,973 B1 | 11/2003 | Schueler et al. | |
| 6,691,687 B1 | 2/2004 | Liang et al. | |
| 6,694,957 B2 | 2/2004 | Schueler et al. | |
| 6,722,129 B2 | 4/2004 | Criddle et al. | |
| 6,729,316 B1 | 5/2004 | Knowles | |
| 6,851,415 B2 | 2/2005 | Mahakul et al. | |
| 6,892,715 B2 * | 5/2005 | Norrick | 123/572 |
| 6,907,869 B2 | 6/2005 | Burgess et al. | |
| 6,925,994 B2 | 8/2005 | Michel | |
| 6,966,310 B2 | 11/2005 | Moren | |
| 6,994,078 B2 | 2/2006 | Roberts et al. | |
| 2003/0106543 A1 * | 6/2003 | Gschwindt et al. | 123/572 |
| 2004/0139734 A1 | 7/2004 | Schmeichel et al. | |
| 2006/0064966 A1 | 3/2006 | Opris | |

* cited by examiner

CLOSED CRANKCASE VENTILATION SYSTEM

This application claims the benefit of U.S. Provisional Application No. 60/731,484, filed Oct. 31, 2005.

TECHNICAL FIELD

This disclosure relates to a closed crankcase ventilation system and, more particularly, to a closed crankcase ventilation system for internal combustion engines.

BACKGROUND

In internal combustion engines, fuel and air may be introduced into cylinders for combustion. Pistons may move within the cylinders under the influence of a crankshaft located in a crankcase. In each cylinder, a piston may compress the fuel and air mixture preparatory to combustion of the mixture. Combustion may then drive the pistons and yield power output. The power output may be used to drive a machine. Along with the desired output of power, combustion products are created. Most of these combustion products are exhausted from the cylinder into an exhaust system.

The seal or fit between pistons and cylinders is not perfect. Some of the combustion products may blow by the pistons and enter into the crankcase. These combustion products are termed "blow-by gases" or "blow-by." Blow-by gases contain contaminants normally found in exhaust gases, such as, for example, hydrocarbons (HC), carbon monoxide (CO), $NO_x$, soot, and unburned or partially burned fuel. Lubricating oil in the crankcase tends to be atomized or otherwise entrained in the hot blow-by gases to form what may be termed an aerosol.

Blow-by gases in the crankcase, including entrained lubricating oil, must be vented as crankcase emissions to relieve pressure in the crankcase. Some systems vent the crankcase emissions directly to the atmosphere. Such venting may place undesirable portions of crankcase emissions directly into the environment. Other systems direct the crankcase emissions into the engine exhaust system where they receive emission treatment to the same extent engine exhaust gases receive treatment before release to the environment. Still others direct the crankcase emissions either to the air intake side of the engine for mixing with the air and fuel introduced into the cylinders, or to the engine exhaust system where they are treated and recirculated for introduction into the air intake system. Those systems where the crankcase emissions are reintroduced into the engine for burning belong to the class of closed crankcase ventilation (CCV) systems.

Some engines, such as large diesel engines, for example, utilize forced induction to enhance the power output of the engine. This may involve superchargers or turbochargers. Returning crankcase emissions to the intake side of a compressor in a supercharger or turbocharger can result in fouling of the compressor wheel in a relatively short time period. The fouling is compounded in multiple turbocharger systems as the heat increases in downstream compressor units. Additionally, cooling units downstream of a supercharger or turbocharger may be fouled. Therefore, crankcase emissions must undergo extensive purification before being returned to the intake in a supercharged or turbocharged engine. Further, even with extensive purification, some level of contamination may still exist that may be harmful to the supercharger or turbocharger, cooling units, or various engine components.

Some machines deriving power from internal combustion engines also have various components or systems that utilize compressed air for their operation. For example, a machine may be provided with an air operated braking system requiring compressed air for its operation. A machine may also be provided with various air operated actuators requiring compressed air for operation. In addition, it may sometimes be necessary to provide some type of pumping unit to assist in venting blow-by gases and resulting crankcase emissions from the crankcase of the engine of the machine.

An internal combustion engine may operate over a range of speed and load conditions. Over this range of speed and load conditions, blow-by gases and resulting crankcase emissions may vary substantially. Blow-by gases and resulting crankcase emissions may likewise vary over the life of an engine as relevant parts encounter wear and tear from use. Variations in blow-by gases and crankcase emissions may cause significant fluid flow variations in venting the crankcase emissions. Some control over these resulting fluid flow variations, for example by suitable valving, may be beneficial and desirable.

A crankcase ventilation system is disclosed in U.S. Pat. No. 6,892,715, issued to Norrick on May 17, 2005. In the system of the Norrick patent, the crankcase emissions are passed to a compressor which in turn delivers the crankcase emissions directly into the engine air intake system. A bleed air line is provided to supply air to the compressor when crankcase emissions are not sufficient to satisfy compressor demands. Upstream of the compressor and downstream of the air bleed line, an oil separator is provided to separate oil from the crankcase emissions. Downstream of the oil separator and upstream of the compressor, a relief valve is provided for those situations where crankcase emissions exceed compressor intake demands.

While the system of Norrick may be successful in removing oil from the crankcase emissions to some extent and delivering crankcase emissions into the engine air intake system, the compressor is dedicated solely to delivering the crankcase emissions, and any air drawn in through the bleed air line, to the air intake system. The efficiency of dual use of the compressor is lacking since the compressed fluid exiting the compressor is not available for components which use compressed air for their operation. Moreover, the only treatment of the crankcase emissions prior to being injected into the air intake system is oil separation. Products of combustion present in the crankcase emissions are left untreated and allowed to directly enter the engine intake where they may cause engine damage.

The disclosed closed crankcase ventilation system is directed toward improvements and advancements over the foregoing technology.

SUMMARY OF THE INVENTION

In one aspect, the present disclosure is directed to a closed crankcase ventilation system for an internal combustion engine. A compressor is configured to compress air and enhance the venting of crankcase emissions from a crankcase of the engine. A flow path extends between the crankcase and an intake of the compressor. A prioritizing device is configured to regulate the flow of crankcase emissions and control pressure within the crankcase. A treatment element is located downstream of the compressor for treating the air and crankcase emissions to remove entrained oil. A first conduit is located downstream of the treatment element and is configured to introduce a first portion of the air and crankcase emissions into one of an exhaust system for the engine and an air intake system for the engine. A second conduit is located downstream of the treatment element and is configured to introduce a second portion of the air and crankcase emissions into a system having at least one component utilizing compressed air for its operation.

In another aspect, the present disclosure is directed to a method for closed crankcase ventilation comprising providing a flow path to vent crankcase emissions from the crankcase of an internal combustion engine. The flow of crankcase emissions is regulated and the pressure within the crankcase is controlled by a prioritizing device. A compressor is used to enhance the flow of crankcase emissions through the flow path. Air and crankcase emissions from the crankcase are compressed. The air and crankcase emissions are treated to remove entrained oil. A first portion of the treated air and crankcase emissions is introduced into one of an exhaust system for the engine and an air intake system for the engine. A second portion of the treated air and crankcase emissions is utilized to operate at least one component utilizing compressed air for its operation.

DETAILED DESCRIPTION

Figure 1:
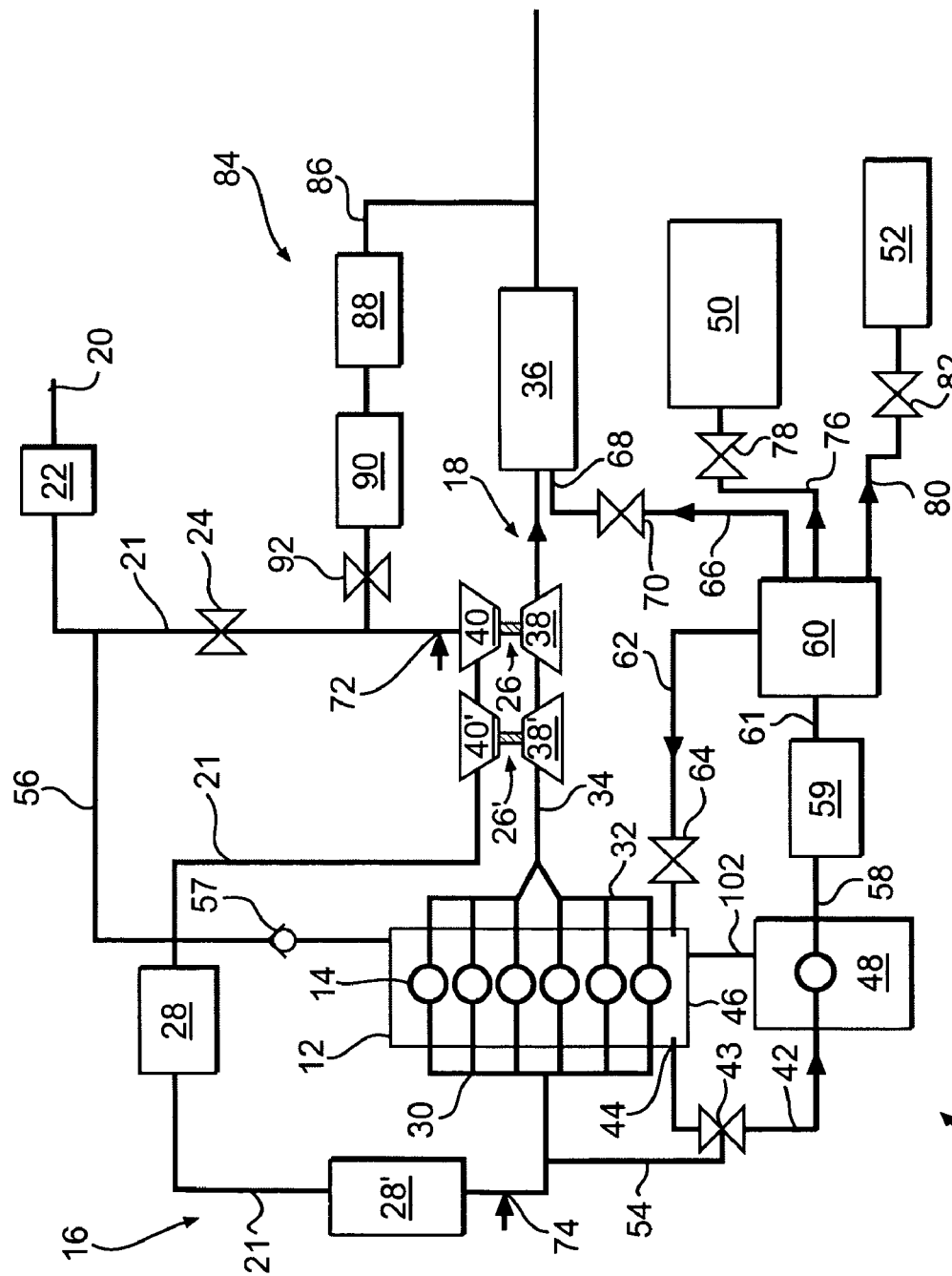
FIG. 1 is a schematic and diagrammatic representation of a closed crankcase ventilation system according to an exemplary disclosed embodiment.

FIG. 1 illustrates an exemplary closed crankcase ventilation (CCV) system 10. CCV system 10 may include an internal combustion engine 12. Engine 12 may include combustion cylinders 14 for generating power. Engine 12 may be provided with an air intake system 16 and an exhaust system 18. Air intake system 16 may include various components including, for example, intake opening 20, air filter 22, throttle valve 24, one or more turbochargers 26, 26', one or more cooling modules 28, 28', and intake manifold 30. The various components of air intake system 16 may be located along an intake flow path, such as, for example, intake conduit 21. Exhaust system 18 may include various components including, for example, exhaust manifold 32, exhaust conduit 34, and aftertreatment module 36.

The one or more turbochargers 26, 26' may be composed of components forming a part of both the air intake system 16 and the exhaust system 18. Turbocharger 26 is composed of a turbine section 38 located in the exhaust system and driven by exhaust gases passing through exhaust conduit 34. Turbine section 38 is drivingly connected to a compressor section 40 that is located in air intake system 16. Compressor section 40 compresses air that is drawn into air intake system 16 through intake opening 20. Turbocharger 26', when present, includes components substantially similar to those of turbocharger 26 including turbine section 38' and compressor section 40'. The compressor section 40' of turbocharger 26' serves to further compress air exiting from compressor section 40 of turbocharger 26.

CCV system 10 may include a flow path for crankcase emissions, such as, for example, a conduit 42, having a connection 44 opening into the crankcase 46 of engine 12. While the crankcase 46 is not fully visible in the diagrammatic illustration of FIG. 1, crankcase 46 may be located beneath combustion cylinders 14 and serves as a reservoir for the lubricating oil of the engine 12.

A compressor, such as an air compressor 48, may be located in the CCV system. Air compressor 48 may be used to compress air for various purposes, such as, for example, a braking system 50 for a machine or air operated actuator 52 for any of various auxiliary equipment that may be present on a machine. Air compressor 48 may derive air necessary for its operation from any suitable source.

Air compressor 48 may derive air necessary for its operation from the air intake system 16 by way of a flow path in the form of a conduit 56. Conduit 56 may connect at one end to the intake conduit 21 downstream of air filter 22 and upstream of throttle valve 24 and connect at its other end to the crankcase 46 of engine 12. In this way, air necessary for operation of air compressor 48 may be drawn through crankcase 46 and then through conduit 42 to the intake of the air compressor 48. As air is drawn through crankcase 46, crankcase emissions may flow with the air through conduit 42 into air compressor 48. A suitable check valve 57 may be provided in conduit 56 to ensure that air flows along conduit 56 only in a direction toward crankcase 46 for those situations where blow-by gases alone, and thus crankcase emissions, may exceed compressor demands.

Air compressor 48 alternatively may derive air from the air intake system 16 of the engine 12 by way of a flow path along a conduit 54. Conduit 54 may connect to air intake system 16 by a connection to intake conduit 21 at a location downstream of one or more cooling modules 28, 28' and upstream of intake manifold 30, for example. Conduit 54 may join to conduit 42 such that the flow path along conduit 54 and the flow path along conduit 42 merge.

The quantity of blow-by gases, and thus crankcase emissions, may vary with conditions of engine operation. For example, an idling engine may generate a relatively small amount of crankcase emissions while an engine operating under load may generate a relatively large amount of crankcase emissions. Crankcase pressure may vary with the quantity of emissions generated. It may be desirable to provide a prioritizing device configured to regulate the flow of crankcase emissions and control pressure within the crankcase 46. The prioritizing device may take various forms. For example, the prioritizing device may include a restriction in conduit 54 whereby priority of flow will be given to the flow emanating from crankcase 46. Alternatively, the prioritizing device may include a pressure balancing valve, such as, for example, pressure balancing valve 43.

Conduit 54 may have one end connected to air intake system 16 and another end connected to pressure balancing valve 43. The flow path of air from air intake system 16 and the flow path for crankcase emissions may be coextensive between pressure balancing valve 43 and the intake of air compressor 48. Pressure balancing valve 43 may be a priority valve which regulates the flow of air from conduit 54 and the flow of crankcase emissions in conduit 42 and controls the pressure within crankcase 46.

Regardless of whether air compressor 48 derives the air necessary for its operation directly from the intake conduit 56 or indirectly from the intake conduit 56 through crankcase 46, or from some other suitable source, conduit 42 forms a flow path for crankcase emissions between crankcase 46 and air compressor 48. Air compressor 48 pumps crankcase emissions from crankcase 46 and, thus, crankcase emissions pass from crankcase 46 into air compressor 48.

Crankcase emissions include the products of combustion within combustion cylinders 14 that blow by the pistons from the combustion cylinders 14 into crankcase 46. These combustion products primarily include gases, but may include various other matters, such as particulates. When these gases are forced from the combustion cylinders 14 into the crankcase 46, they tend to entrain lubricating oil that is contained within the crankcase 46. These gases must be vented from crankcase 46 to relieve the accumulating pressure within the crankcase 46 as the engine 12 operates. As the gases are vented from the crankcase 46 by way of conduit 42, the entrained oil flows along with the gases. Collectively, the gases and other matter in the crankcase 46, along with entrained oil, may be referred to as crankcase emissions.

After being vented from crankcase 46 by way of conduit 42, the crankcase emissions proceed into air compressor 48 along with the air that is drawn into the air compressor 48 from the selected source of air. Within the air compressor 48, the crankcase emissions are compressed along with the air. A conduit 58 may be connected to the downstream end of air compressor 48. Conduit 58 may be in turn connected to a cooling module 59.

Crankcase emissions may be at a relatively high temperature as they emerge from crankcase 46. Air compressor 48 may even further increase the temperature of the crankcase emissions and air. Cooling module 59 may be employed to receive air and crankcase emissions from conduit 58 and suitably reduce the temperature of the air and crankcase emissions. The reduction in temperature may better prepare the compressed air and crankcase emissions for use in braking system 50 or actuator 52 to be described more fully below.

A conduit 61 may be connected to the downstream end of cooling module 59. After passing through cooling module 59, air and crankcase emissions, now suitably cooled, may flow through conduit 61 and into a treatment element which may be in the form of a filtering module 60. Filtering module 60 may be of a type suitable for removing oil entrained in the flow of gases and other matter deriving from crankcase 46 from the, now cooled, compressed air and crankcase emissions.

Lubricating oil that is separated from the compressed air and crankcase emissions by filtering module 60 may be channeled back to crankcase 46 by way of a flow path in the form of a conduit 62 connected between filtering module 60 and crankcase 46. A suitable valve 64 may be located in the conduit 62 to regulate the flow of oil back to crankcase 46. Some filtering modules, such as filtering module 60, contain, as part of the module, a reservoir to hold a limited supply of oil. Valve 64 may be of a type that permits intermittent flow of oil back to the crankcase in coordination with a reservoir in the filtering module 60 reaching capacity. Additionally, valve 64 may be of the one-way type, permitting flow only in a direction from the filtering module 60 toward the crankcase 46.

Upon removal of entrained oil within filtering module 60, and perhaps small quantities of particulate matter and/or other matter deriving from crankcase 46, compressed air and crankcase emissions continue to flow downstream of filtering module 60. Upon exit from filtering module 60, the compressed air and crankcase emissions may be branched into a plurality of flow paths. For example, the compressed air and crankcase emissions may be branched into three flow paths in the form of conduits 66, 76, and 80 leading to different systems. There is no particular limitation on the number of flow paths branching from filtering module 60. It may be that in a given situation, only two flow paths would be provided while, in other circumstances, more than three flow paths could be present. The number of flow paths may be determined in accordance with the number of systems into which it may be desirable to convey compressed air.

In one embodiment, a first and major portion of the compressed air and crankcase emissions may be directed along a flow path in the form of conduit 66 to any suitable location in exhaust system 18 upstream of aftertreatment module 36. For example, conduit 66 may suitably be joined to a connection 68 at the upstream side of the aftertreatment module 36 in exhaust system 18. A suitable valve 70 may be provided in conduit 66 to regulate the flow of compressed air and crankcase emissions flowing within conduit 66 to the exhaust system 18 and into the upstream side of the aftertreatment module 36.

It is not necessary for conduit 66 to be joined to a location within the exhaust system 18. In one embodiment, conduit 66 could be joined to a suitable location within the air intake system 16. For example, conduit 66 could be joined to the air intake system 16 at a connection 72 upstream of the compressor section 40 of turbocharger 26. As another example, conduit 66 could be joined to the air intake system 16 at a connection 74 downstream of the one or more cooling modules 28, 28' and upstream of the intake manifold 30. In a given situation, circumstances may dictate that, for efficiency or for convenience, conduit 66 could be joined to air intake system 16 at other locations as well.

A second portion of the compressed air and crankcase emissions exiting filtering module 60 may be directed along a flow path in the form of a conduit to a system having at least one element utilizing compressed air for its operation. For example, a second portion of the compressed air and crankcase emissions may be directed along conduit 76 which may be joined to filtering module 60 at one end and to a braking system 50, such as the braking system of a machine, for example, at its other end. In this way, air compressor 48 provides the source of compressed air necessary for the operation of the braking system 50. Cooling module 59 may ensure that the compressed air and crankcase emissions are at a temperature suitable for braking system 50. A valve, such as, for example, valve 78, may be placed in conduit 76 to regulate flow to braking system 50.

Alternatively, the second portion of compressed air and crankcase emissions exiting filtering module 60 may be directed along a flow path in the form of conduit 80. Conduit 80 may be joined to filtering module 60 at one end and to actuator 52 at its other end. For purposes of this disclosure, the term "actuator" is intended to include a single actuator, a plurality of actuators, or a system of actuators. It is not uncommon for a machine and auxiliary equipment associated with a machine to require compressed air for operation of portions of the machine or auxiliary equipment. Thus, air compressor 48 provides the source of compressed air that may be necessary for the operation of actuator 52.

Cooling module 59 may ensure that the compressed air and crankcase emissions are at a temperature suitable for use with actuator 52. A valve, such as, for example, valve 82, may be placed in conduit 80 to regulate flow to actuator 52. It will, of course, be understood that portions of the compressed air and crankcase emissions emerging from filtering module 60 could be directed to both a braking system 50 and actuator 52 and to any other components that might require or be enhanced by the presence of compressed air.

The aftertreatment module 36 located within the exhaust system 18 may be any suitable type of exhaust treatment unit designed to, in some way, reduce emissions to the atmosphere that may be deemed undesirable. For example, aftertreatment module 36 could be, or could include, a component generally known as a particulate filter or, in the case of use with a diesel engine, a diesel particulate filter. Such a filter is designed to remove particulate matter from engine exhaust. Alternatively, aftertreatment module 36 could be, or could include, a catalytic component. Aftertreatment module 36 could include both particulate removing and catalytic components. Additionally, aftertreatment module 36 could include other suitable expedients designed to treat exhaust to reduce emissions to the environment that may be deemed undesirable.

Between the exhaust system 18 and the air intake system 16, there may be a system 84 for cleaning gases and/or exhaust. System 84 may withdraw a portion of the exhaust emerging from aftertreatment module 36 and inject the withdrawn portion into the intake system 16 for ingestion or induction into engine 12 to be consumed in the combustion cylinders 14. System 84 may include a flow path in the form of a conduit 86. Conduit 86 may be connected at one end to exhaust system 18 downstream of aftertreatment module 36 and at its other end at a location in the intake system 16 downstream of throttle valve 24 and upstream of turbocharger 26. Located along conduit 86 may be a cooling module 88, a mass airflow sensor 90, and a valve 92. Cooling module 88 may reduce the temperature of hot gases emanating from aftertreatment module 36. Mass airflow sensor 90 may control valve 92 to suitably regulate the injection of gases into the intake system 16.

INDUSTRIAL APPLICABILITY

The disclosed CCV system 10 may be employed on any type of internal combustion engine 12 to reduce overall emissions to the environment while extending the usable lifetime of engine, air intake system, and exhaust system components. A single compressor 48 may serve to enhance the flow of crankcase emissions from the crankcase 46 of engine 12, as well as provide a source of compressed air for various systems, such as a braking system 50 and actuator 52, that may include components that require compressed air for their operation. The air compressor 48 may be suitably located to be driven by the engine 12 that forms a part of the closed crankcase ventilation system 10.

Air compressor 48 may be sized commensurate with the size of the engine 12 and the compressed air requirements anticipated for use by braking system 50, actuator 52, and/or other equipment. In addition, air compressor 48 may be sized to provide adequate capacity to consume crankcase emissions resulting from increased blow-by gases near the end of the life of an engine.

Figure 2:
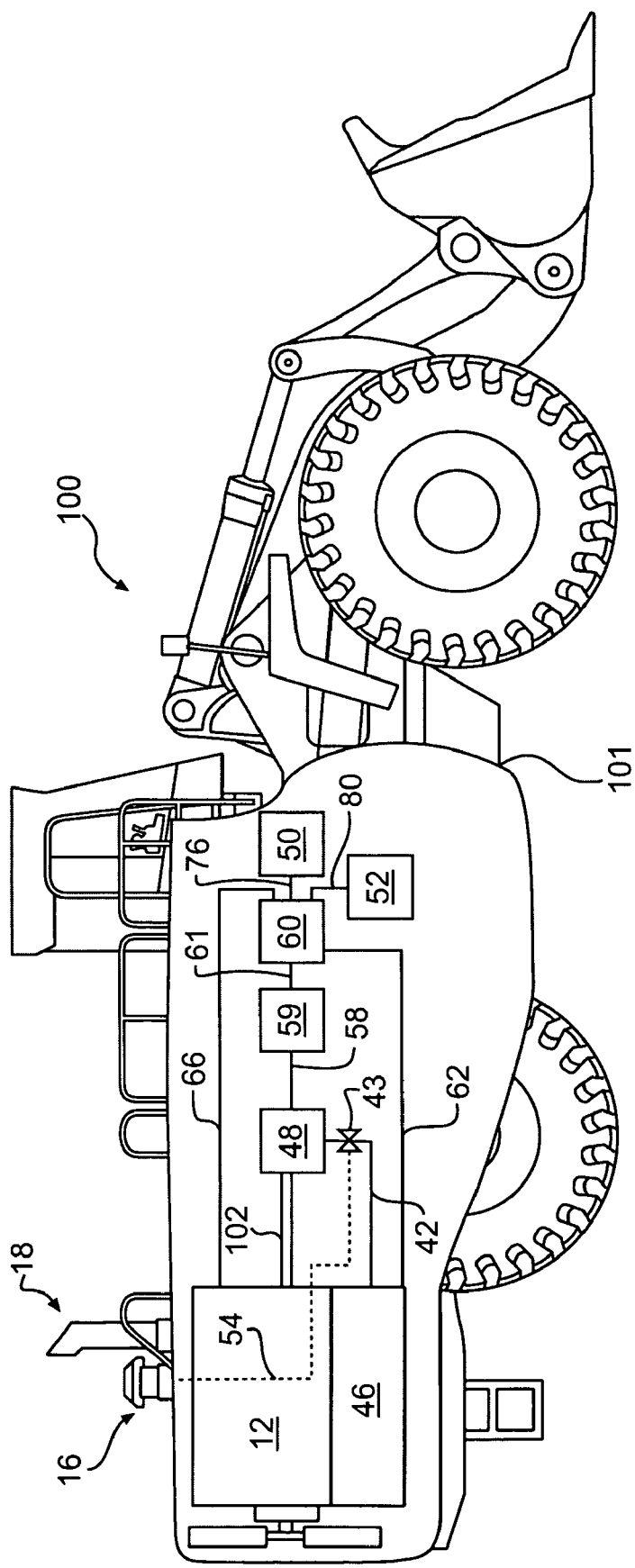
FIG. 2 is a diagrammatic representation of a machine provided with a closed crankcase ventilation system according to a disclosed embodiment.

FIG. 2 diagrammatically illustrates a machine 100 to which the disclosed CCV system 10 may be applied. Machine 100 may include engine 12 with crankcase 46, intake system 16, and exhaust system 18, all suitably supported on a chassis 101. An air compressor 48 may be mounted on the machine 100 and suitably disposed to be driven by a drive member 102 connected between the engine 12 and the air compressor 48. Thus, the engine 12 may drive the air compressor 48 through the drive member 102. The particular location of the air compressor 48 relative to engine 12 may vary within reasonable limits to accommodate various necessary components of the machine 100.

Conduit 42 may connect between crankcase 46 of engine 12 and air compressor 48. The length of conduit 42 and its routing may vary to accommodate the logistics of locating various components on the machine 100. As diagrammatically shown in FIG. 2, air compressor 48 may derive air from air intake system 16 by way of conduit 54. Conduit 54 may suitably be connected to conduit 42 by way of a prioritizing device such as, for example, pressure balancing valve 43. Thus compressor 48 is provided both with a source of air and with the flow of crankcase emissions from crankcase 46, and the flow of crankcase emissions from crankcase 46 may be enhanced by the air compressor 48. Pressure balancing valve 43, or an alternative prioritizing device, may be configured to give priority to flow from crankcase 46 to thereby control crankcase pressure. It is to be noted that under heavy engine loads, the prioritizing device, such as pressure regulating valve 46, may permit flow of crankcase emissions fully satisfying compressor 48 demands. Air compressor 48 may then compress crankcase emissions or both air and crankcase emissions. Air compressor 48 exhausts into conduit 58.

From conduit 58, compressed air and crankcase emissions are directed into cooling module 59. After the compressed air and crankcase emissions have suitably had their temperature reduced in cooling module 59, they flow on to filtering module 60 by way of conduit 61. In filtering module 60, lubricating oil entrained in the blow by gases, forming a part of the crankcase emissions, and now mixed with air, may be removed and returned to crankcase 46 through conduit 62.

Downstream of filtering module 60, the compressed air and crankcase emissions, suitably cooled and now substantially free from lubricating oil, may be directed in various flow paths. One flow path may be along conduit 66. Conduit 66 may direct a portion of the compressed air and crankcase emissions to various portions of either the exhaust system 18 or the intake system 16 of engine 12 (FIG. 1). Another flow path may be along conduit 76 to a braking system having one or more components that require compressed air for operation.

Still another flow path may be along conduit 80 to an actuator 52, which may include plural actuators or a system of actuators, having one or more components that require compressed air for operation and are designed to control various equipment that may be a part of or auxiliary to the machine 100. Such equipment may include valve actuators that operate with compressed air, actuators that enable the operation of a clamping device generally associated with hitch mechanisms that may be used in connection with machines, actuators in air-ride suspension systems associated with some machines, and actuators that are designed, generally, to move one mechanical element relative to another.

By utilizing a single air compressor, such as air compressor 48, to enhance the flow of crankcase emissions, control a braking system, and/or control various actuators, there is an economy of design that saves space in locating the various components necessary for engine operation, equipment operation, and control of exhaust emissions. By using a pressure balancing valve in connection with the air intake for the air compressor and the flow path for crankcase emissions, crankcase pressure may be appropriately controlled while flow of crankcase emissions is suitably enhanced. By using a cooling module between the air compressor and the filtering module, the temperature of compressed air and crankcase emissions emanating from the air compressor are brought within temperature ranges commensurate with use of the compressed air and crankcase emissions in a braking system or actuator requiring the use of compressed air. Accordingly, instead of separate air compressors for the braking system and any machine associated actuators, and a separate pumping unit to ensure adequate flow of crankcase emissions from the crankcase, a single compressor may operate to perform functions otherwise requiring separate units.

It is to be understood that the disclosed CCV system may be employed on any type of machine. FIG. 2 illustrates an example of one type of machine on which the disclosed CCV system may be employed. However, the disclose CCV system may be employed in connection with on-highway trucks, off-road haulage equipment, and numerous types of machines known in the art.

It will be apparent to those skilled in the art that various modifications and variations can be made to the disclosed CCV system without departing from the scope of the disclosure. Other embodiments will be apparent to those skilled in the art from consideration of the specification and practice of the disclosed embodiments. It is intended that the specification and examples be considered as exemplary only with the true scope of protection being indicated by the following claims.

What is claimed is:

1. A closed crankcase ventilation system for an internal combustion engine comprising:
    a compressor configured to compress air and enhance the venting of crankcase emissions from a crankcase of the engine;
    a flow path between the crankcase and an intake of the compressor;
    a prioritizing device configured to regulate the flow of crankcase emissions and control pressure within the crankcase;
    a treatment element downstream of the compressor configured to treat the air and crankcase emissions to remove entrained oil;
    a first conduit downstream of the treatment element configured to introduce a first portion of the air and crankcase emissions into one of an exhaust system for the engine and an air intake system for the engine; and
    a second conduit downstream of the treatment element configured to introduce a second portion of the air and crankcase emissions into a system having at least one component utilizing compressed air for its operation.

2. The system of claim 1, wherein the prioritizing device is a valve situated in the flow path.

3. The system of claim 1, further including a cooling module downstream of the compressor and upstream of the treatment element.

4. The system of claim 1, further including a flow path for air between the air intake system for the engine and the intake of the compressor.

5. The system of claim 4, wherein the prioritizing device is a valve situated in the flow path between the crankcase and the intake of the compressor, and wherein the flow path for air between the air intake system for the engine and the intake of the compressor includes a conduit having one end connected to the air intake system for the engine and another end connected to the valve.

6. The system of claim 1, wherein the exhaust system for the engine includes an aftertreatment module for treating engine exhaust, and the first conduit is configured to introduce the first portion of the air and crankcase emissions into the exhaust system upstream of the aftertreatment device.

7. The system of claim 1, wherein the air intake system for the engine includes at least one turbocharger having a compressor section, at least one cooling module, and an intake manifold; and
    wherein the first conduit is configured to introduce a first portion of the air and crankcase emissions into the air intake system for the engine at one of a point upstream of the compressor section, and a point between the at least one cooling module and the intake manifold.

8. The system of claim 1, wherein the at least one component is a component of one of a braking system and an actuator.

9. The system of claim 1, including a flow path for directing entrained oil removed by the treatment element to the crankcase of the engine.

10. A method for closed crankcase ventilation, comprising:
    providing a flow path to vent crankcase emissions from the crankcase of an internal combustion engine;
    regulating flow of crankcase emissions and controlling pressure within the crankcase by a prioritizing device;
    using a compressor to enhance the flow of crankcase emissions through the flow path;
    compressing air and crankcase emissions from the crankcase;
    treating the compressed air and crankcase emissions to remove entrained oil;
    introducing a first portion of the treated air and crankcase emissions into one of an exhaust system for the engine and an air intake system for the engine; and
    utilizing a second portion of the treated air and crankcase emissions to operate at least one component utilizing compressed air for its operation.

11. The method of claim 10, wherein regulating flow of crankcase emissions and controlling pressure within the crankcase by a prioritizing device includes providing a valve in the flow path.

12. The method of claim 10, further including providing a cooling module downstream of the compressor and cooling the compressed air and crankcase emissions before treating them.

13. The method of claim 10, further including providing a flow path for air between the air intake system for the engine and an intake of the compressor.

14. The method of claim 10, wherein regulating flow of crankcase emissions and controlling pressure within the crankcase by a prioritizing device includes providing a valve in the flow path to vent crankcase emissions from the crankcase, and further including:
    regulating the flow of air in the flow path between the air intake system and the intake of the compressor by the valve.

15. The method of claim 10, further including providing the exhaust system of the engine with an aftertreatment module and introducing the first portion of the treated air and crankcase emissions into the exhaust system of the engine at a location upstream of the aftertreatment module.

16. The method of claim 10, further including utilizing the second portion of the treated air and crankcase emissions to operate one of a braking system and an actuator.

17. A machine, comprising:
    a chassis;
    an engine mounted to the chassis and having a crankcase;
    at least one component associated with the machine and configured to utilize compressed air for its operation;
    a flow path configured to enable crankcase emissions to flow from the crankcase of the engine;
    a prioritizing device configured to regulate the flow of crankcase emissions and control pressure within the crankcase;
    a compressor configured to enhance the flow of crankcase emissions from the crankcase and compress air and crankcase emissions;

a treatment element downstream of the compressor configured to treat air and crankcase emissions to remove oil;

a first conduit downstream of the treatment element configured to introduce a first portion of the treated air and crankcase emissions into one of an exhaust system for the engine and an air intake system for the engine; and a second conduit downstream of the treatment element and configured to introduce a second portion of the treated air and crankcase emissions into a system for operating the at least one component.

18. The machine of claim 17, wherein the prioritizing device includes a valve situated in the flow path.

19. The machine of claim 17, wherein the at least one component associated with the machine and configured to utilize compressed air for its operation is a component of a braking system.

20. The machine of claim 17, further including a cooling module downstream of the compressor and upstream of the treatment element.

* * * * *

UNITED STATES PATENT AND TRADEMARK OFFICE
CERTIFICATE OF CORRECTION

PATENT NO.         : 7,320,316 B2
APPLICATION NO.    : 11/476731
DATED              : January 22, 2008
INVENTOR(S)        : D. Craig Young et al.

It is certified that error appears in the above-identified patent and that said Letters Patent is hereby corrected as shown below:

On the Title Page:

Item (73) Assignee: Caterpillar Inc., Peoria, IL (US) change to Caterpillar Inc., Peoria, IL (US) and Bendix Commercial Vehicle Systems LLC, Elyria, OH (US)

Signed and Sealed this

Sixteenth Day of December, 2008

JON W. DUDAS
*Director of the United States Patent and Trademark Office*